US012684236B2

(12) United States Patent
Takao

(10) Patent No.: US 12,684,236 B2
(45) Date of Patent: Jul. 14, 2026

(54) FOCUS DETECTION APPARATUS AND METHOD, IMAGE CAPTURING APPARATUS, AND STORAGE MEDIUM

(71) Applicant: CANON KABUSHIKI KAISHA, Tokyo (JP)

(72) Inventor: Maiko Takao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 18/982,586

(22) Filed: Dec. 16, 2024

(65) Prior Publication Data

US 2025/0220305 A1      Jul. 3, 2025

(30) Foreign Application Priority Data

Dec. 28, 2023    (JP) ................................. 2023-223261

(51) Int. Cl.
H04N 23/67 (2023.01)
H04N 23/611 (2023.01)

(52) U.S. Cl.
CPC ......... H04N 23/675 (2023.01); H04N 23/611 (2023.01)

(58) Field of Classification Search
CPC ... H04N 23/675; H04N 23/611; H04N 23/672
USPC .................................................... 348/207.99
See application file for complete search history.

(56) References Cited

U.S. PATENT DOCUMENTS

| | | | | |
|---|---|---|---|---|
| 10,033,919 B2 * | 7/2018 | Akaguma | ............ | H04N 23/611 |
| 10,321,042 B2 * | 6/2019 | Sakaguchi | ............. | G02B 7/285 |
| 11,653,091 B2 * | 5/2023 | Ishii | ..................... | H04N 23/673 |
| | | | | 348/345 |
| 2011/0298961 A1 * | 12/2011 | Yoshida | ................. | G03B 13/36 |
| | | | | 348/E5.022 |
| 2013/0135543 A1 * | 5/2013 | Kaifu | ..................... | H04N 23/75 |
| | | | | 349/33 |
| 2014/0016021 A1 * | 1/2014 | Uchida | ................ | H04N 25/704 |
| | | | | 348/353 |
| 2014/0176783 A1 * | 6/2014 | Shibagami | ........... | H04N 23/673 |
| | | | | 348/349 |
| 2016/0073006 A1 * | 3/2016 | Funamoto | .............. | G06V 20/52 |
| | | | | 348/345 |
| 2021/0329172 A1 * | 10/2021 | Ishii | ..................... | H04N 23/611 |

FOREIGN PATENT DOCUMENTS

| | | |
|---|---|---|
| JP | 2021173803 A | 11/2021 |
| JP | 7066388 B2 | 5/2022 |

* cited by examiner

*Primary Examiner* — Usman A Khan
(74) *Attorney, Agent, or Firm* — Cowan, Liebowitz & Latman, P.C.

(57)            ABSTRACT

A subject detection unit detects a subject and characteristic area included in the subject from an image, a setting unit sets focus detection areas of a predetermined size in the subject and characteristic area, a detection unit detects a focus state in each focus detection area, and a selection unit selects a first area that satisfies a predetermined condition and a second area that includes the characteristic area from the focus detection areas. A prediction unit predicts a focus state of the second area at an arbitrary time based on a first history of focus state of the first area based on the focus states and a second history of difference between the focus states of the first and second areas, and an acquisition unit acquires an actuation amount for focusing on the second area based on the focus state thereof.

22 Claims, 16 Drawing Sheets

F I G. 2
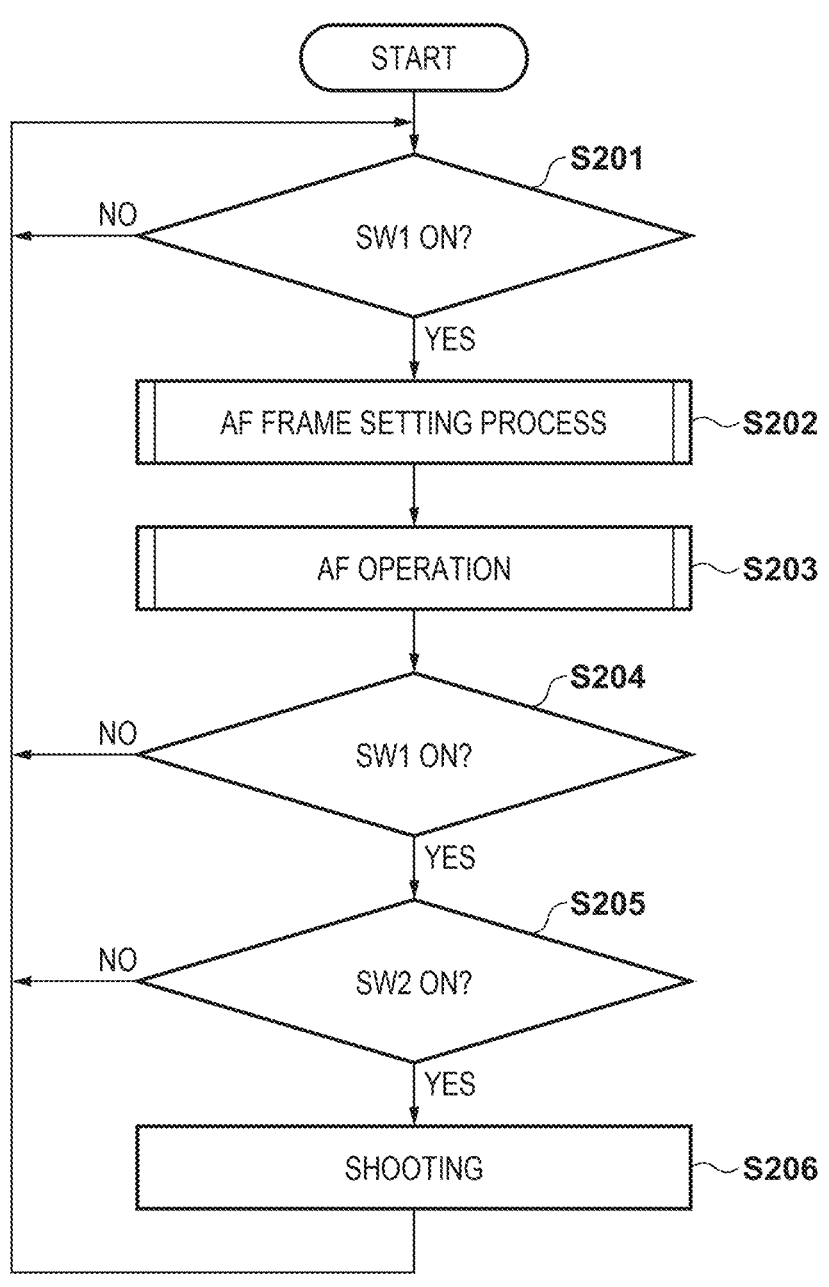

F I G. 3
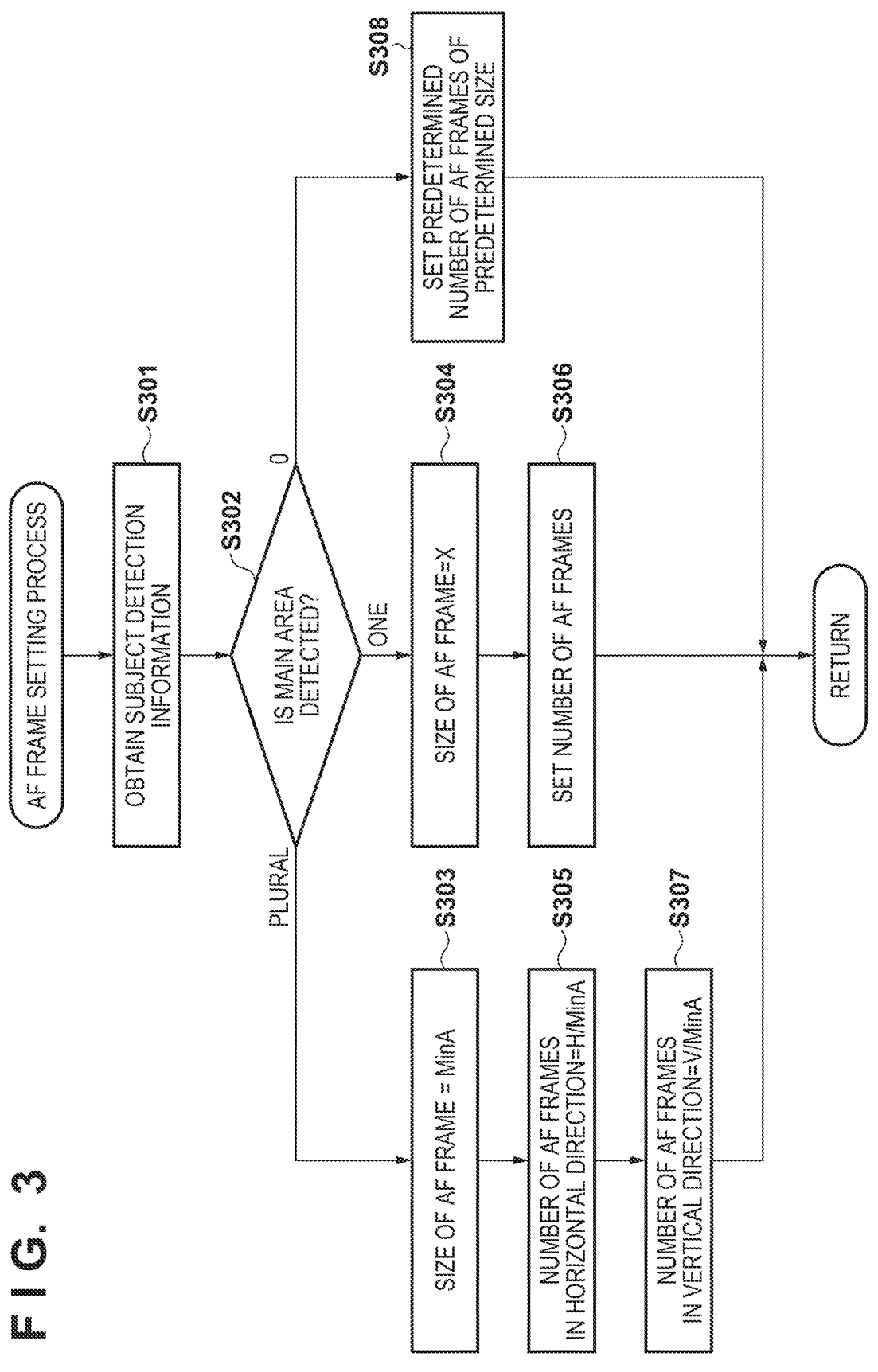

F I G.  4A
401
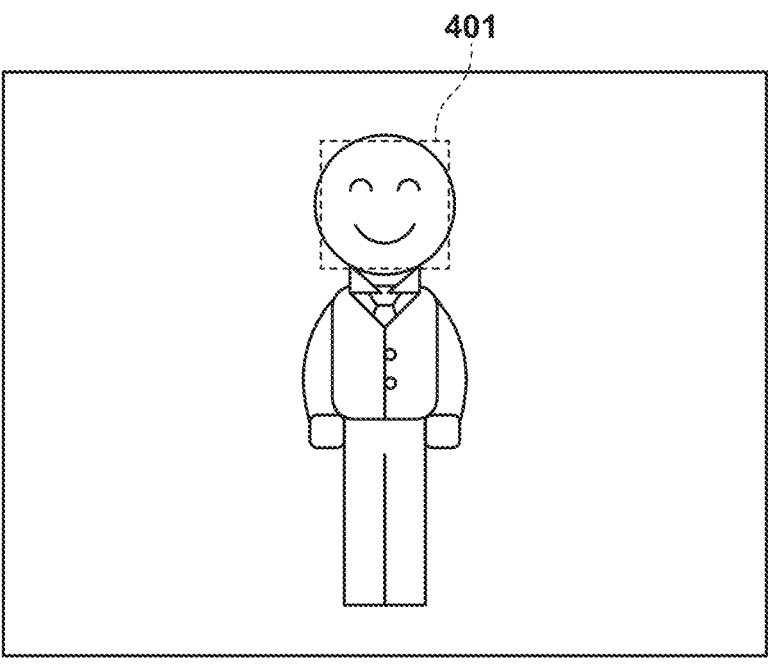
F I G.  4B
402
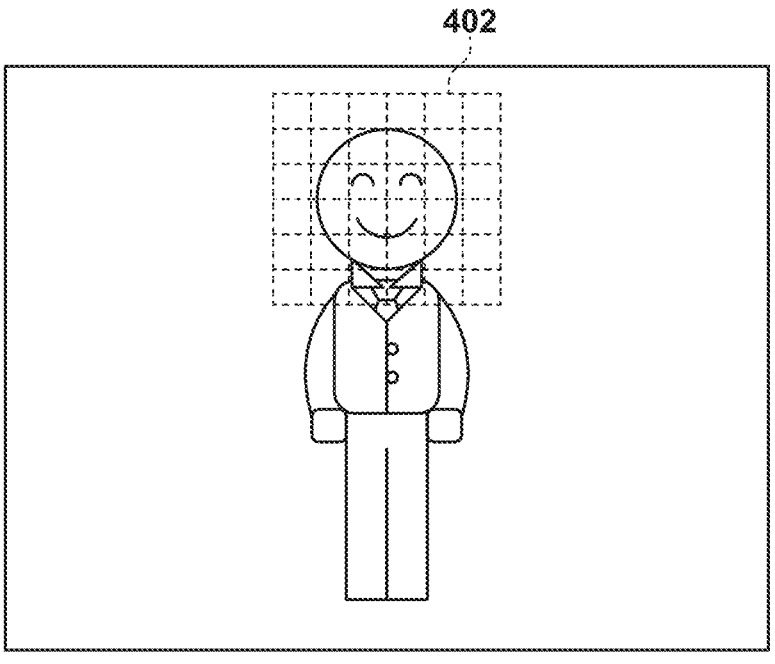

F I G. 5A
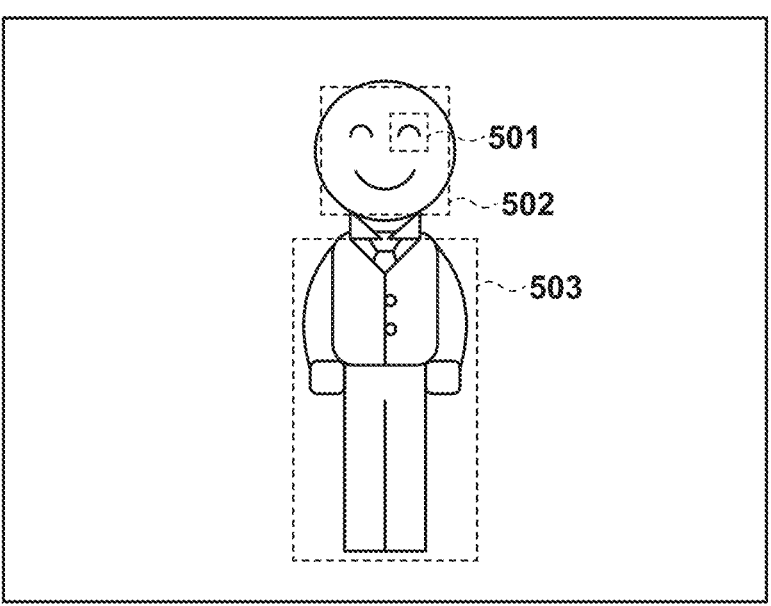
F I G. 5B
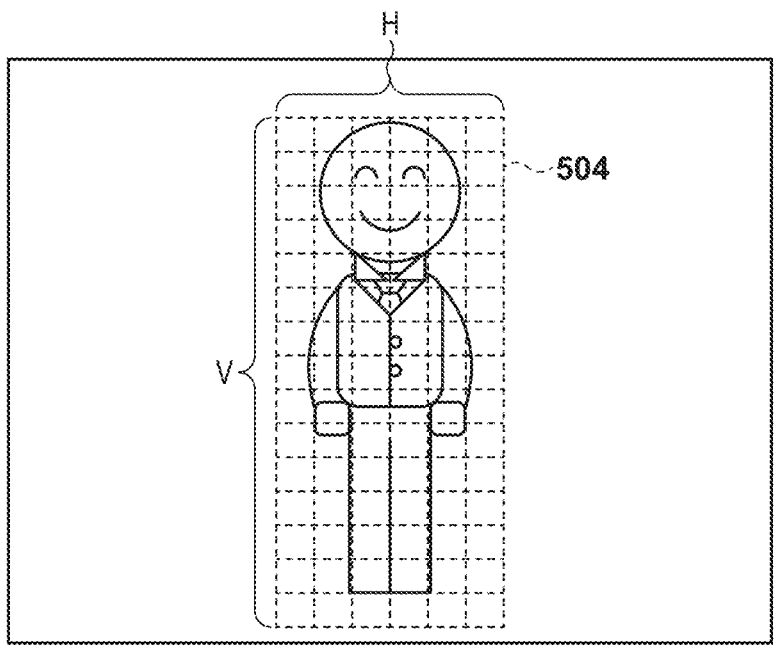

F I G. 7
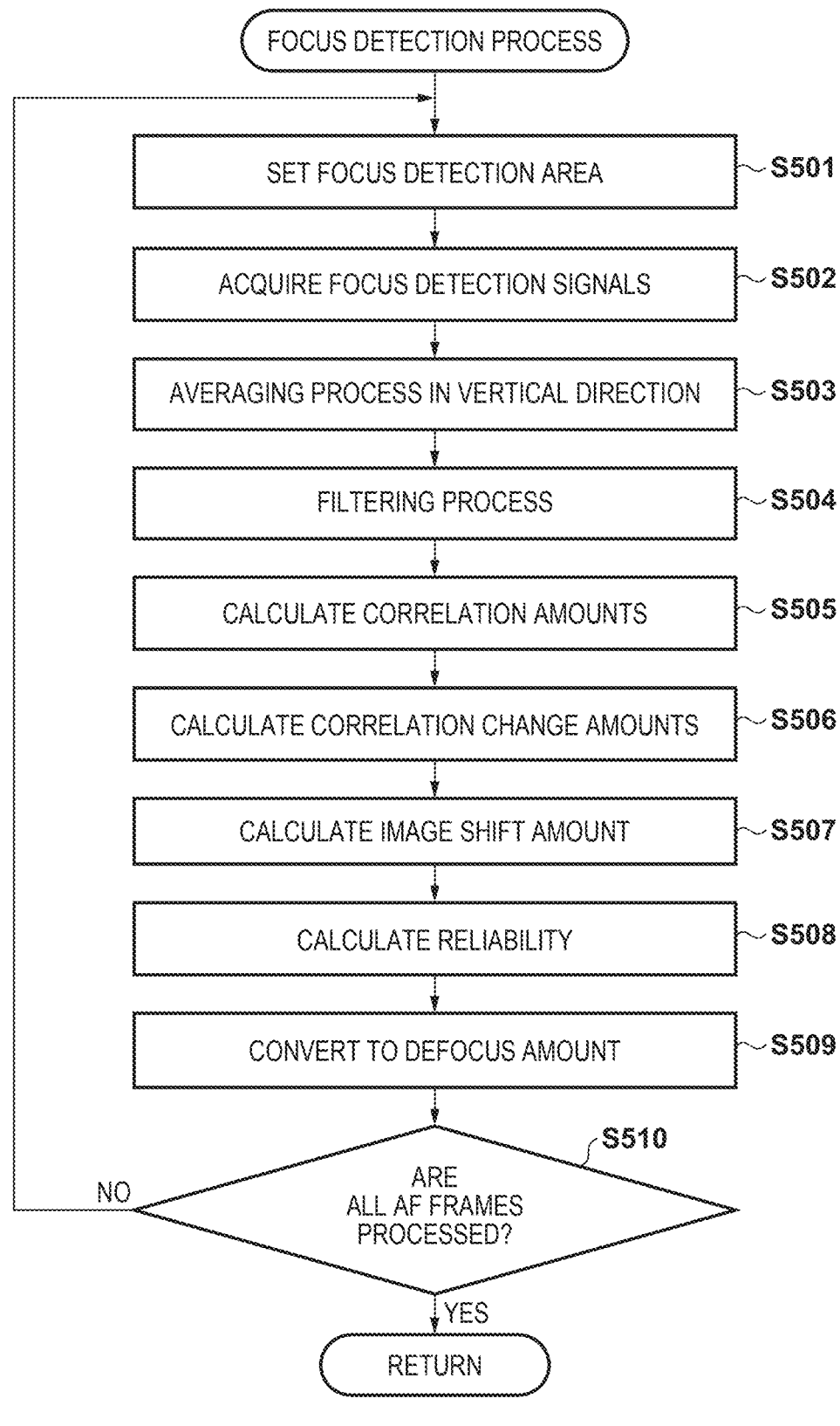

F I G. 8
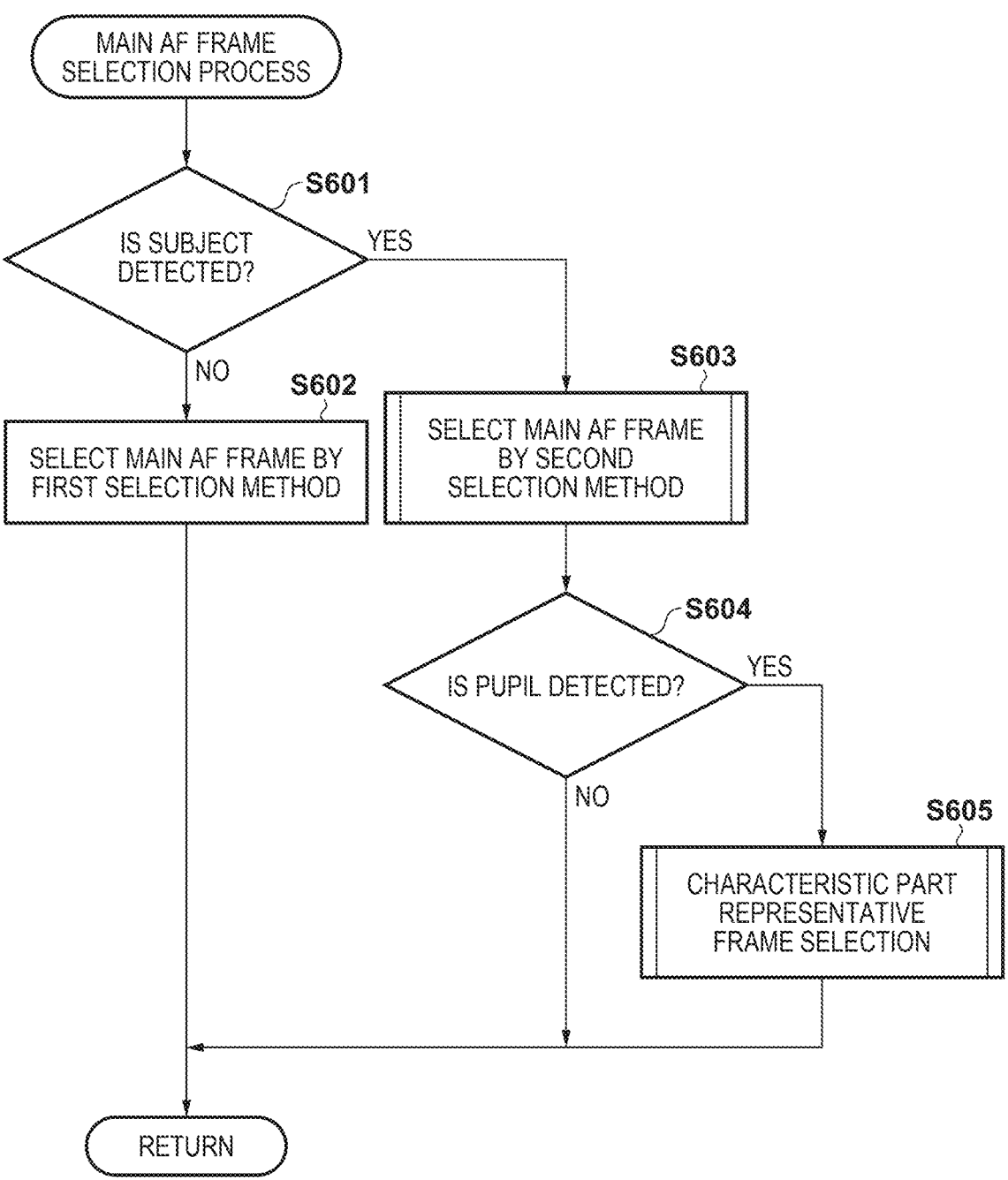

F I G. 9
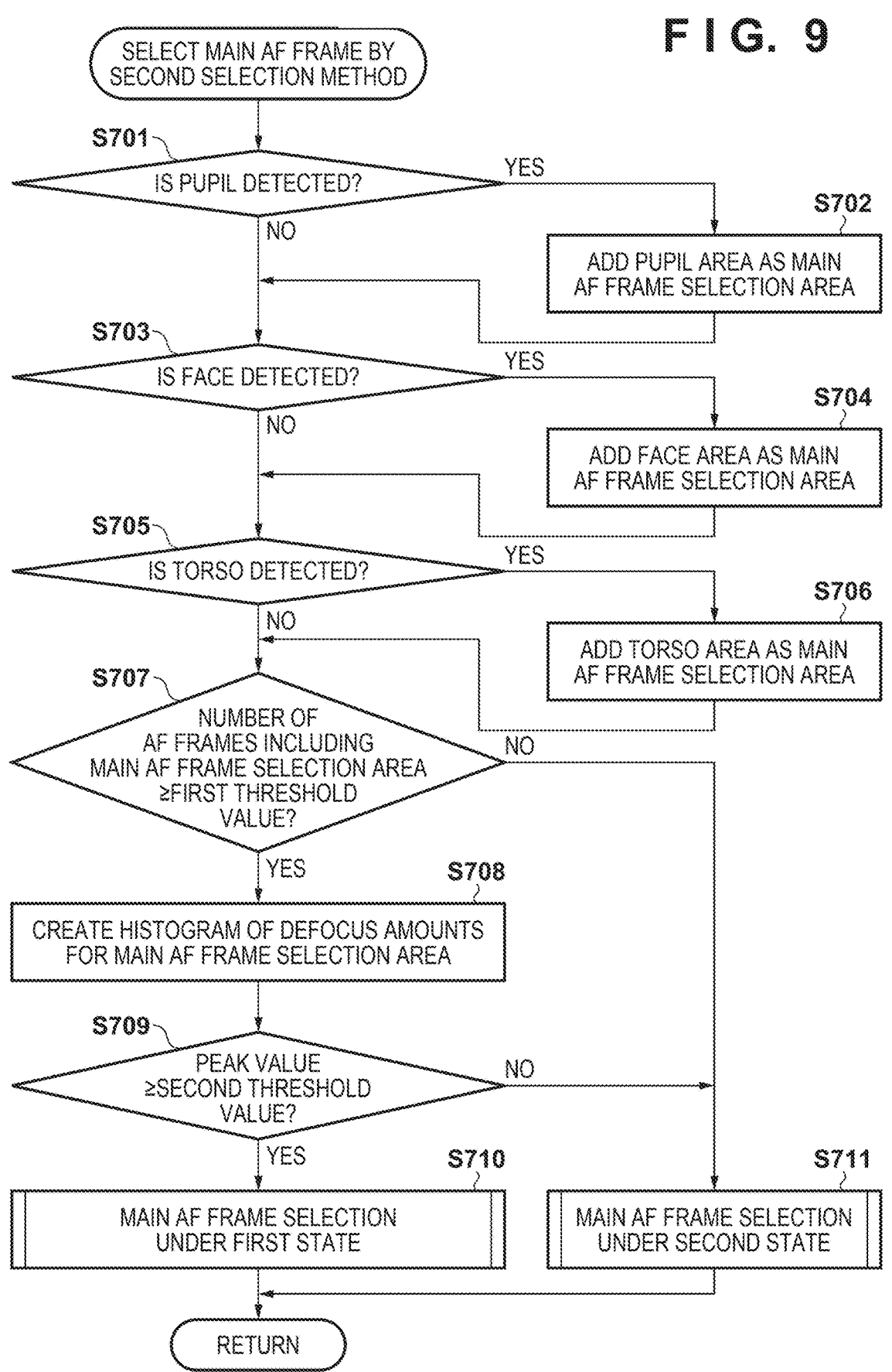

F I G. 12
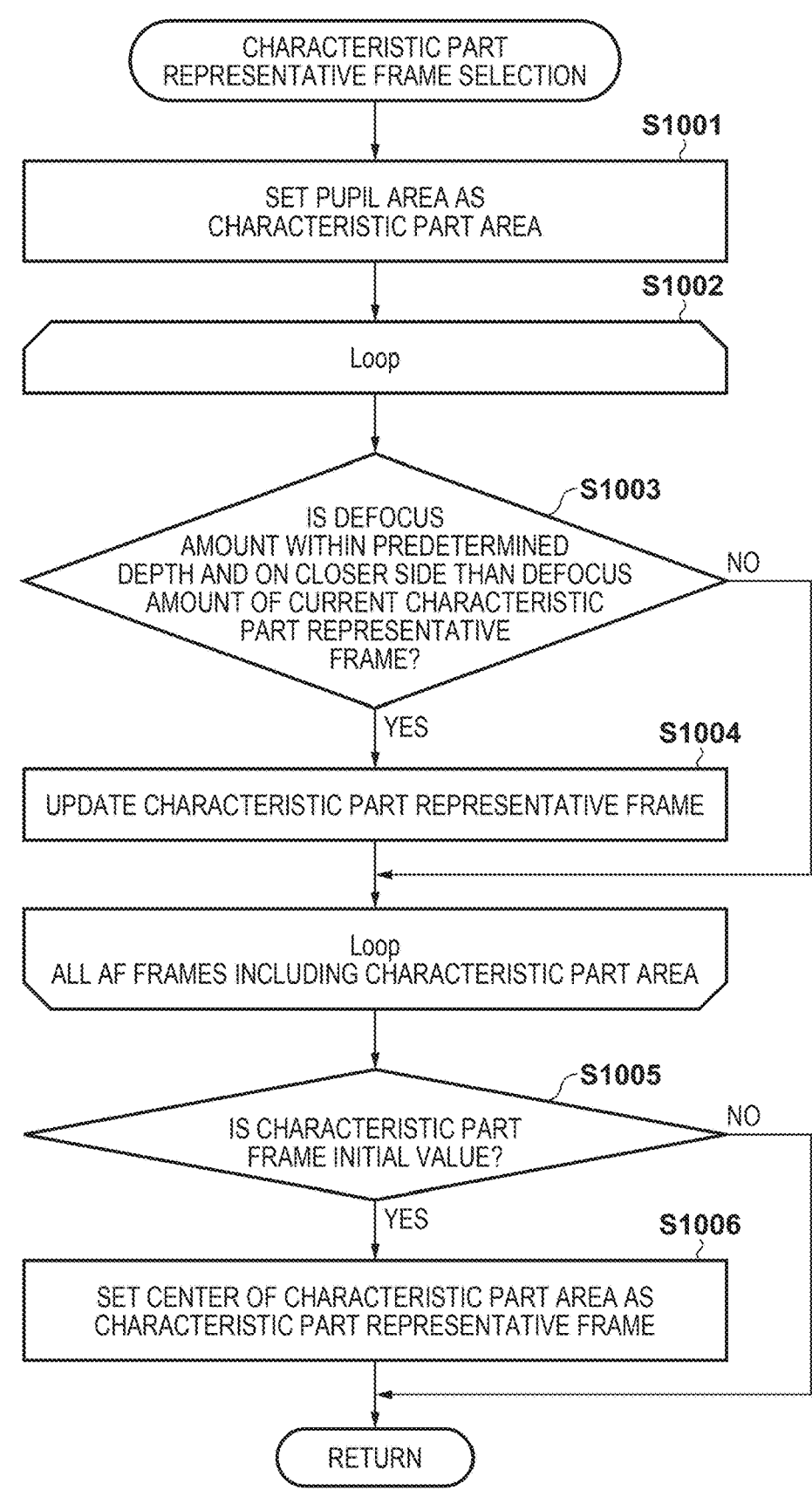

F I G. 13
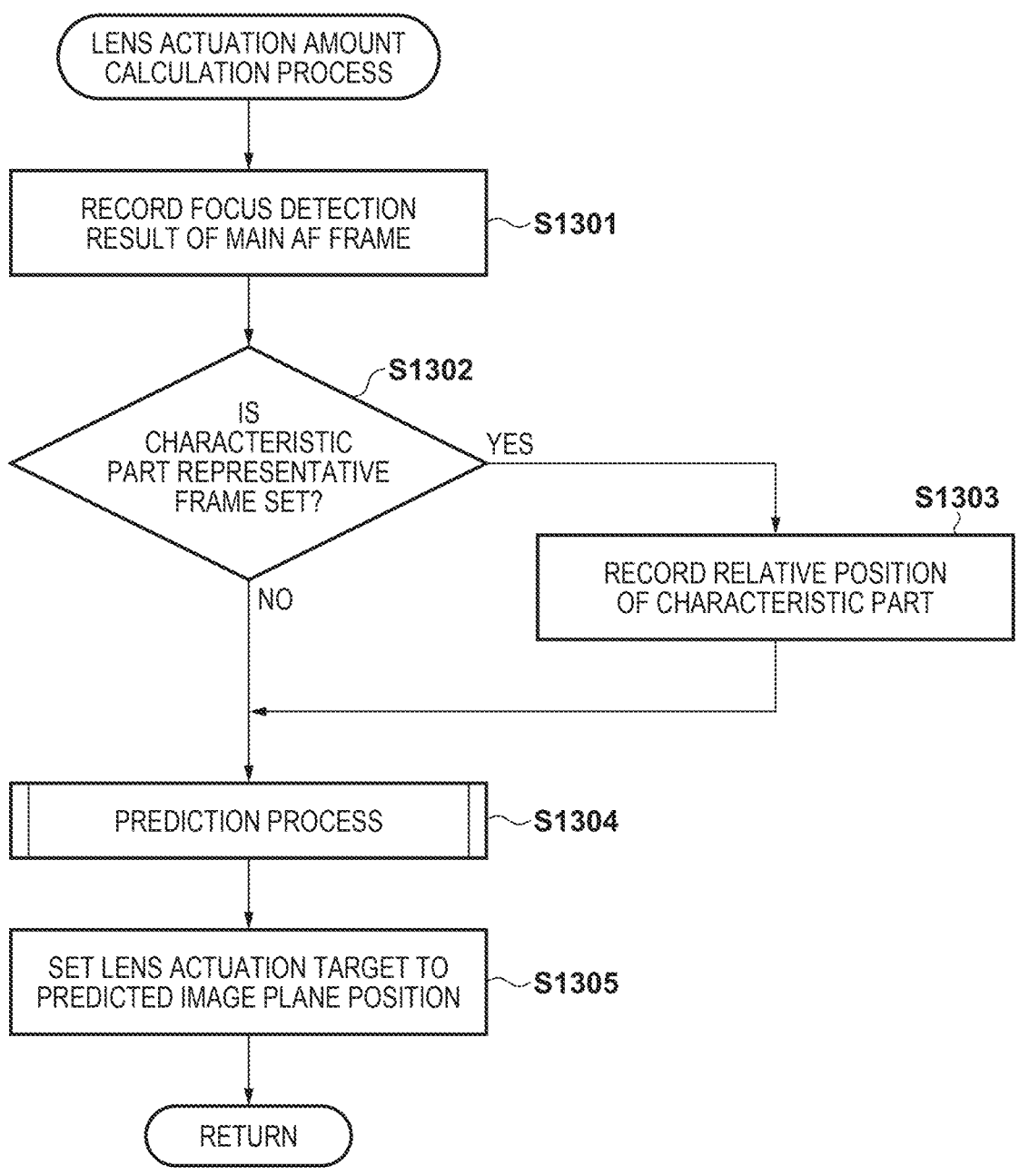

F I G. 15
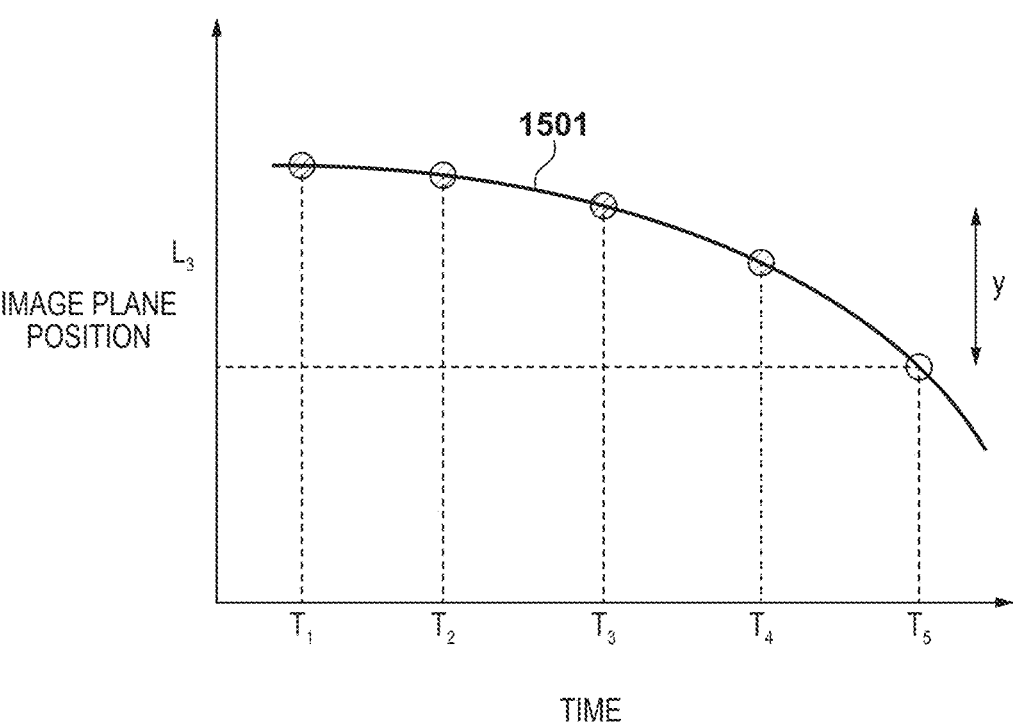
F I G. 16
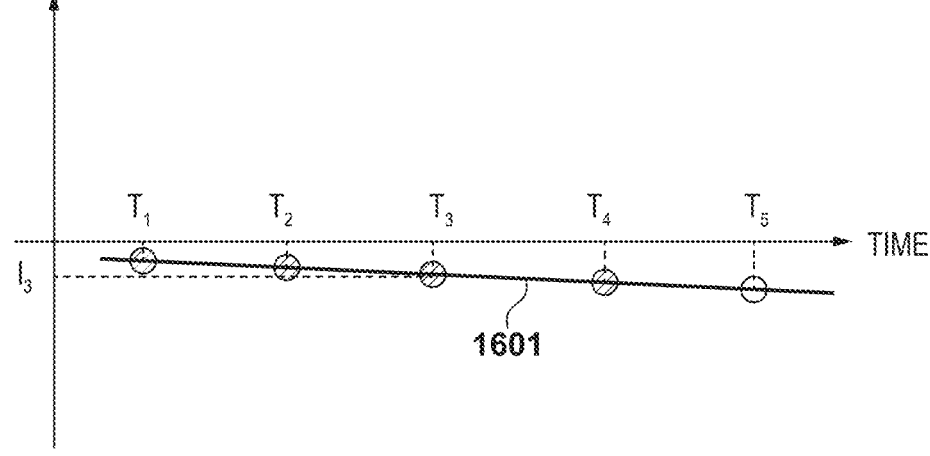

F I G. 17
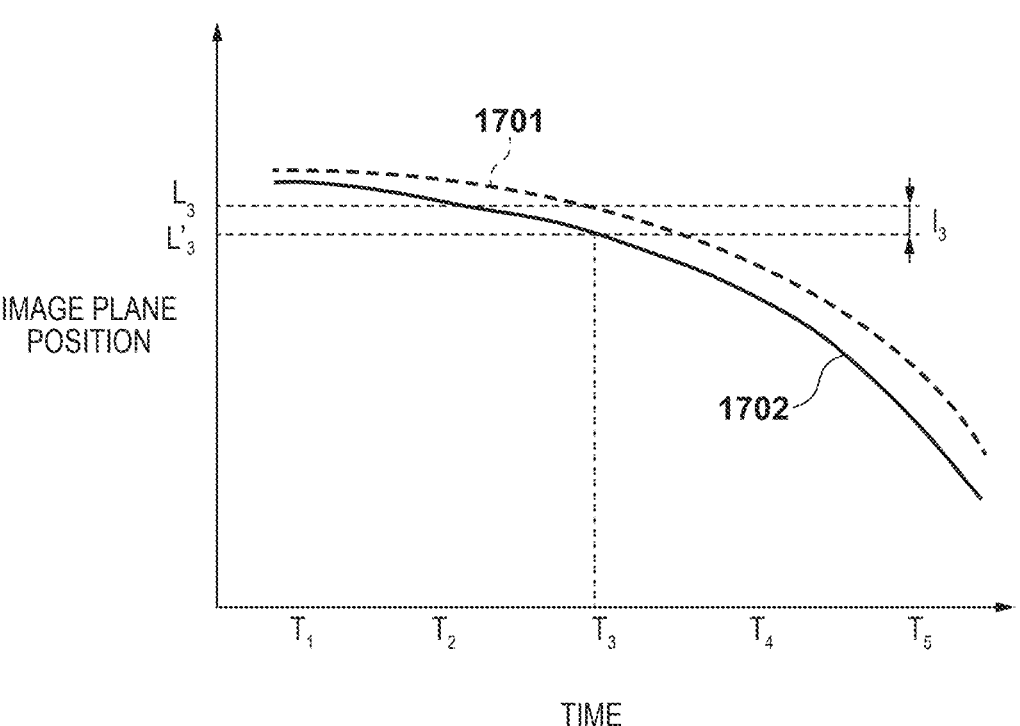

FOCUS DETECTION APPARATUS AND METHOD, IMAGE CAPTURING APPARATUS, AND STORAGE MEDIUM

BACKGROUND OF THE INVENTION

Field of the Invention

The present invention relates to a focus detection apparatus and method, an image capturing apparatus, and a storage medium, and more particularly to a focus adjustment technique that utilizes subject detection information.

Description of the Related Art

In recent years, cameras equipped with a focus adjustment function (hereinafter referred to as "AF") that automatically adjusts the focal position of an imaging lens have become widely used. As methods for performing the focus adjustment, various AF methods have been put to practical use, such as an on-image plane phase difference AF method using an image sensor and a contrast AF method.

Furthermore, in various AF methods, there are techniques for identifying and focusing on the area of the main subject. Japanese Patent Laid-Open No. 2021-173803 discloses a control method for focusing on a part to be prioritized while avoiding regions in which focus detection is difficult among detected subjects.

In addition, many of them have a servo shooting mode that actuates the focus lens to focus on not only a stationary subject but also a moving subject. The servo shooting mode has a function of predicting how the subject will move based on its past movement history. Japanese Patent No. 7066388 discloses a control method that stores focus detection history for each part of a detected subject and switches the history to be used for prediction depending on conditions.

However, in Japanese Patent Laid-Open No. 2021-173803 and Japanese Patent No. 7066388, if there is a temporary change in the state of the subject, such as the posture of the subject or the way the light illuminates it, problems such that the subject detection of detecting a high-priority part cannot be performed or focus detection cannot be performed may arise, which causes the problem that it becomes impossible to focus on the high-priority part.

SUMMARY OF THE INVENTION

The present invention has been made in consideration of the above situation, and even if there is a temporary change in the state of the subject, continues to focus on a high-priority part.

According to the present invention, provided is a focus detection apparatus comprising one or more processors and/or circuitry which function as: a subject detection unit that detects a subject and a characteristic area included in the subject from an image of an image signal repeatedly output from an image capturing apparatus; a setting unit that sets a plurality of focus detection areas of a predetermined size in the subject and the characteristic area detected by the subject detection unit; a detection unit that detects a focus state in each of the plurality of focus detection areas set by the setting unit based on the image signal; a selection unit that selects a first area that satisfies a predetermined condition and a second area that includes the characteristic area from the plurality of focus detection areas; a prediction unit that predicts a focus state of the second area at an arbitrary time based on a first history of focus state of the first area based on the focus states detected by the detection unit and a second history of difference between the focus state of the first area and the focus state of the second area; and an acquisition unit that acquires an actuation amount of a focus adjustment unit for focusing on the second area based on the focus state of the second area predicted by the prediction unit.

Further, according to the present invention, provided is an image capturing apparatus comprising: an image sensor; and a focus detection apparatus comprising one or more processors and/or circuitry which function as: a subject detection unit that detects a subject and a characteristic area included in the subject from an image of an image signal repeatedly output from the image capturing apparatus; a setting unit that sets a plurality of focus detection areas of a predetermined size in the subject and the characteristic area detected by the subject detection unit; a detection unit that detects a focus state in each of the plurality of focus detection areas set by the setting unit based on the image signal; a selection unit that selects a first area that satisfies a predetermined condition and a second area that includes the characteristic area from the plurality of focus detection areas; a prediction unit that predicts a focus state of the second area at an arbitrary time based on a first history of focus state of the first area based on the focus states detected by the detection unit and a second history of difference between the focus state of the first area and the focus state of the second area; and an acquisition unit that acquires an actuation amount of a focus adjustment unit for focusing on the second area based on the focus state of the second area predicted by the prediction unit.

Furthermore, according to the present invention, provided is a focus detection method comprising: detecting a subject and a characteristic area included in the subject from an image of an image signal repeatedly output from the image capturing apparatus; setting a plurality of focus detection areas of a predetermined size in the detected subject and characteristic area; detecting a focus state in each of the set plurality of focus detection areas based on the image signal; selecting a first area that satisfies a predetermined condition and a second area that includes the characteristic area from the plurality of focus detection areas; predicting a focus state of the second area at an arbitrary time based on a first history of focus state of the first area based on the detected focus states and a second history of difference between the focus state of the first area and the focus state of the second area; and acquiring an actuation amount of a focus adjustment unit for focusing on the second area based on the predicted focus state of the second area.

Further, according to the present invention, provided is a non-transitory computer-readable storage medium, the storage medium storing a program that is executable by the computer, wherein the program includes program code for causing the computer to function as a focus detection apparatus comprising: a subject detection unit that detects a subject and a characteristic area included in the subject from an image of an image signal repeatedly output from the image capturing apparatus; a setting unit that sets a plurality of focus detection areas of a predetermined size in the subject and the characteristic area detected by the subject detection unit; a detection unit that detects a focus state in each of the plurality of focus detection areas set by the setting unit based on the image signal; a selection unit that selects a first area that satisfies a predetermined condition and a second area that includes the characteristic area from the plurality of focus detection areas; a prediction unit that predicts a focus state of the second area at an arbitrary time based on a first history of focus state of the first area based on the focus states detected by the detection unit and a second history of difference between the focus state of the first area and the focus state of the second area; and an acquisition unit that acquires an actuation amount of a focus adjustment unit for focusing on the second area based on the focus state of the second area predicted by the prediction unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a flowchart of a shooting operation performed by the image capturing apparatus according to the embodiment.

FIG. 3 is a flowchart explaining AF frame setting process according to the embodiment.

FIGS. 4A and 4B are diagrams explaining the concept of an AF frame in a case where one main area is detected according to the embodiment.

FIGS. 5A and 5B are diagrams explaining the concept of an AF frame in a case where a plurality of main areas are detected according to the embodiment.

FIG. 7 is a flowchart illustrating a focus detection process according to the embodiment.

FIG. 8 is a flowchart illustrating a main AF frame selection process according to the embodiment.

FIG. 9 is a flowchart explaining main AF frame selection using a second selection method according to the embodiment.

FIG. 12 is a flowchart explaining a characteristic part representative frame selection process according to the embodiment.

FIG. 13 is a flowchart of a lens actuation amount calculation process according to the embodiment.

FIG. 15 is a diagram illustrating an example of a prediction curve of a whole subject according to the embodiment.

FIG. 16 is a diagram illustrating an example of a prediction curve of a relative position of a characteristic part according to the embodiment.

FIG. 17 is a diagram illustrating the concept of a prediction process for predicting a characteristic part according to the embodiment.

DESCRIPTION OF THE EMBODIMENTS

Figure 1:
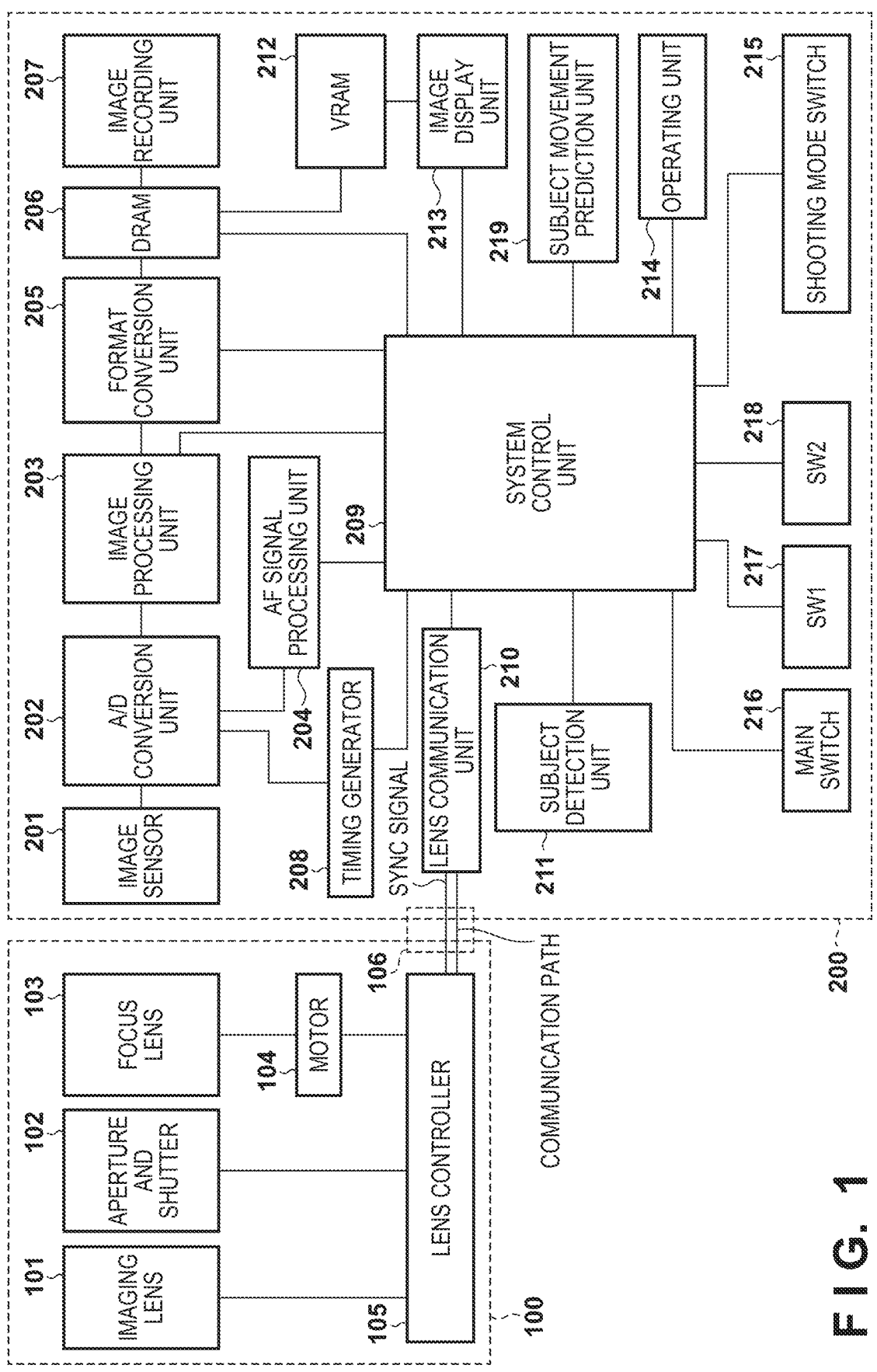
FIG. 1 is a block diagram illustrating a configuration of an image capturing apparatus according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration of an Image Capturing Apparatus

FIG. 1 is a block diagram showing the configuration of an interchangeable lens camera (hereinafter simply referred to as "camera") as an image capturing apparatus in an embodiment of the present invention. The camera according to this embodiment is an example of an image capturing apparatus equipped with a focus adjustment apparatus to which the present invention is applied, and performs focus adjustment by an on-imaging plane phase difference detection method using an output signal from an image sensor that captures a subject image. The present invention can also be applied to, for example, lens-integrated digital cameras and video cameras. The present invention can also be implemented in any electronic device equipped with a camera, such as a mobile phone, a personal computer (laptop, tablet, desktop, etc.), or a game console.

As shown in FIG. 1, the camera is composed of a lens device (interchangeable lens) 100 and a camera body 200. When the lens device 100 is attached to the camera body 200 via a mount portion having an electrical contact unit 106, a lens controller 105 that controls the overall operation of the lens device 100 and a system control unit 209 that controls the overall operation of the camera become capable of communicating with each other.

First, a description will be given of the configuration of the lens device 100. The lens device 100 includes an imaging lens 101 including a zoom mechanism, an aperture and shutter 102 for controlling the amount of light, a focus lens 103 for focusing on an image sensor 201 (described later), a motor 104 for actuating the focus lens, and the lens controller 105.

Next, the configuration of the camera body 200 will be described. The camera body 200 is configured so as to be able to acquire an image signal from a light beam that has passed through the imaging optical system of the lens device 100. In the camera body 200, the image sensor 201 is configured with a CCD or CMOS sensor, and receives reflected light from a subject, converts the light into a signal charge according to the amount of incident light by photodiodes, and accumulates the signal charge. The signal charge accumulated in each photodiode is sequentially read out from the image sensor 201 as a voltage signal (image signal) corresponding to the signal charge in accordance with an actuation pulse provided by a timing generator 208 based on a command from the system control unit 209.

An A/D conversion unit 202 performs A/D conversion on the voltage signal output from the image sensor 201. The A/D conversion unit 202 includes a CDS circuit that removes output noise of the image sensor 201, and a non-linear amplification circuit that processes an image signal before the A/D conversion.

The camera body 200 further includes an image processing unit 203, an AF signal processing unit 204, a format conversion unit 205, and a high-speed built-in memory (hereinafter referred to as "DRAM") 206, such as a random access memory. The DRAM 206 is used as a high-speed buffer for temporarily storing images, or as a work memory for compressing and decompressing images. An image recording unit 207 is made up of a removable recording medium such as a memory card and an interface for it.

The system control unit 209 controls the entire camera, including the timing generator 208 and the shooting sequence. The camera body 200 also includes a lens communication unit 210 that communicates between the camera body 200 and the lens device 100, a subject detection unit 211, a subject movement prediction unit 219, and an image display memory 212 (hereinafter referred to as "VRAM"). An image display unit 213 not only displays captured images, but also displays operation assistance and the camera status, and during shooting, displays the shooting screen and a focus detection area.

The camera body 200 also has various operating members for the user to operate the camera. An operating unit 214 includes, for example, a menu switch for performing various settings such as the camera's shooting function and settings for image playback, and an operation mode changeover switch between shooting mode and playback mode. A shooting mode switch 215 is a switch for selecting a shooting mode such as macro mode or sports mode, and a main switch 216 is a switch for turning on the power of the camera. In addition, the camera body 200 includes a switch (hereinafter referred to as "SW1") 217 for instructing to perform shooting preparation operations such as AF and AE, and a trigger switch (hereinafter referred to as "SW2") 218 for instructing to perform shooting after operating the SW1.

Configuration of the Image Sensor

The image sensor 201 is composed of a CCD or CMOS sensor. Each pixel of the image sensor 201 used in this embodiment is composed of two (a pair) photodiodes A and B and one microlens provided with respect to the pair of photodiodes A and B. In each pixel, incident light forms a pair of optical images on the pair of photodiodes A and B through the microlens, and a pair of pixel signals (A signal and B signal) used as the AF signals described later are output from the pair of photodiodes A and B. In addition, an image signal (A+B signal) can be obtained by adding the pair of pixel signals output from the pair of photodiodes A and B.

By collecting a plurality of A signals and a plurality of B signals output from a plurality of pixels, respectively, a pair of image signals (A image signal, B image signal) is obtained as AF signals (focus detection signals) used for AF by the on-imaging plane phase difference detection method. The AF signal processing unit 204 performs correlation calculation on the A image signal and the B image signal to calculate a phase difference (hereinafter referred to as "image shift amount") which is the shift amount between the A image signal and the B image signal, and further obtains a defocus amount, defocus direction, and reliability (hereinafter collectively referred to as "focus detection information") of the imaging optical system from the calculated image shift amount. Note that in this embodiment, the AF signal processing unit 204 obtains focus detection information for each area within the AF frame set as described later.

Operation of the Image Capturing Apparatus

Next, the shooting operation of the camera in this embodiment will be explained using FIG. 2.

FIG. 2 shows a flow of shooting operation in a case of shooting a still image in a state in which a live-view image is displayed. Note that each process in this flowchart is performed by the system control unit 209 executing a control program stored in a non-volatile memory (not shown).

First, in step S201, the state of SW1 (217) is checked, and if it is ON, the process proceeds to step S202. In step S202, the system control unit 209 performs an AF frame setting process to be described later, sets AF frames for the AF signal processing unit 204, and the process proceeds to step S203. In step S203, an AF operation to be described later is performed for the area of each AF frame set in step S202, and the process proceeds to step S204. In step S204, the state of SW1 (217) is checked, and if it is ON, the process proceeds to step S205, and if not, the process returns to step S201. When SW1 (217) is turned ON, the process proceeds to step S205, and the state of SW2 (218) is checked, and if it is ON, the process proceeds to step S206, and if not, the process returns to step S201. In step S206, shooting is performed, and after the shooting is completed, the process returns to step S201.

AF Frame Setting Process

FIG. 3 is a flowchart explaining the AF frame setting process carried out in step S202 of FIG. 2.

First, in step S301, subject detection information is obtained from the subject detection unit 211. In the following description, the subject in this embodiment is a person, and the main areas of the person (within the subject) is detected. Here, the main areas are the areas of the person's eyes, face, and torso. However, the subject is not limited to a person, and can be, for example, an animal, a vehicle, a train, etc., and the main areas can be determined based on the characteristics of the subject.

As methods for detecting the subject and the main areas, known learning methods by machine learning, recognition processing using image processing, and so on may be used.

For example, there are several types of machine learning:
(1) Support Vector Machine
(2) Convolutional Neural Network
(3) Recurrent Neural Network As an example of recognition processing, a method is known in which a skin-colored area is extracted from the gradation color of each pixel represented by image data, and a face is detected based on the degree of matching with a face outline plate prepared in advance. Another well-known method is to use well-known pattern recognition technology to extract facial features such as the eyes, nose, and mouth to perform face detection.

Note that the detection methods for detecting main areas applicable to the present invention are not limited to these methods, and other methods may also be used.

In step S302, it is determined whether a subject has been detected based on the subject detection information obtained from the subject detection unit 211, and if so, whether a plurality of main areas are detected is determined. If a plurality of main areas are detected, the process proceeds to step S303; if only one main area is detected, the process proceeds to step S304; and if a subject is not detected, the process proceeds to step S308.

Here, the concept of AF frames in the case where one main area is detected and the case where a plurality of main areas are detected will be described with reference to FIGS. 4A and 4B and FIGS. 5A and 5B. FIG. 4A shows a state where only face area 401 is detected, and FIG. 5A shows a state where a pupil area 501, a face area 502, and a torso area 503 are detected. Note that subject detection unit 211 is capable of acquiring the type of subject, such as a person or an animal, the center coordinates of each detected main area, and the horizontal and vertical sizes, and outputs these information as the subject detection information.

In step S303, the smallest main area is selected from the detected plurality of main areas, and the smaller of the horizontal and vertical sizes of the smallest main area is set as MinA. That is, in the example of FIG. 5A, the smaller of the horizontal and vertical sizes of the pupil area 501 is set as MinA. Then, this value of MinA is set as the length of one side of one AF frame 504 (AF frame size).

In step S305, the horizontal size H of an area including all of the main areas is obtained from the horizontal coordinates and horizontal sizes of the detected main areas, as shown in FIG. 5B, and the number of AF frames in the horizontal direction is determined by dividing the obtained horizontal size H by the AF frame size MinA. Next, in step S307, the vertical size V of the area including all of the main areas is obtained from the vertical coordinates and vertical sizes of the detected main areas, as shown in FIG. 5B, and the number of AF frames in the vertical direction is determined by dividing the obtained vertical size V by the AF frame size MinA, and the AF frame setting process ends. Note that the order of the process of step S305 and the process of step S307 may be reversed, or they may be performed in parallel.

In this embodiment, the AF frame is a square using the length of the shorter side of the smallest main area, but the present invention is not limited to this. For example, the horizontal size and vertical size of the AF frame may be made different, or the size of the AF frame may be set based on the size of an area that includes all the main areas and the number of AF frames that the system control unit 209 can handle.

On the other hand, if the number of detected main areas is not plural, AF frames each having a predetermined size X are set for the detected face in step S304. The predetermined size X may be the pupil size estimated from the face, or may be set to a size that ensures good S/N ratio and sufficient focusing performance can be expected in consideration of a low-illumination environment. In this embodiment, the pre-determined size X is set to an estimated pupil size. Then, in step S306, as shown in FIG. 4B, the number of AF frames is set using AF frames of size X that include the face area 401 and can handle cases where the face moves.

Furthermore, if a subject is not detected, in step S308, the size, setting positions, and number of AF frames are deter-mined by a known method. Known methods include, for example, a method of setting one AF frame of a predeter-mined size in the center, a method of setting AF frames of a predetermined size at a plurality of arbitrary positions, and a method of dividing the screen into multiple areas and using each area as an AF frame. There are also various other methods, such as a user setting the AF frame using the operation unit 214, and the present invention is not limited to these methods.

Note that in the examples shown in FIGS. 4A and 4B and FIGS. 5A and 5B, a plurality of AF frames are set so as to cover the main area/areas, but the present invention is not limited to this, and for example, a plurality of AF frames may be set discretely within the main area or areas.

Once the AF frames are set by the above processing, the process proceeds to step S203 in FIG. 2.

The above-mentioned AF frame setting process does not have to be performed every time an image is input, and may be performed once every plural images are input. In that case, when the AF frame setting process is not performed, the set AF frames may be stored in the DRAM 206, and the AF frames stored at the closest timing may be read out and used.

AF Operation

Figure 6:
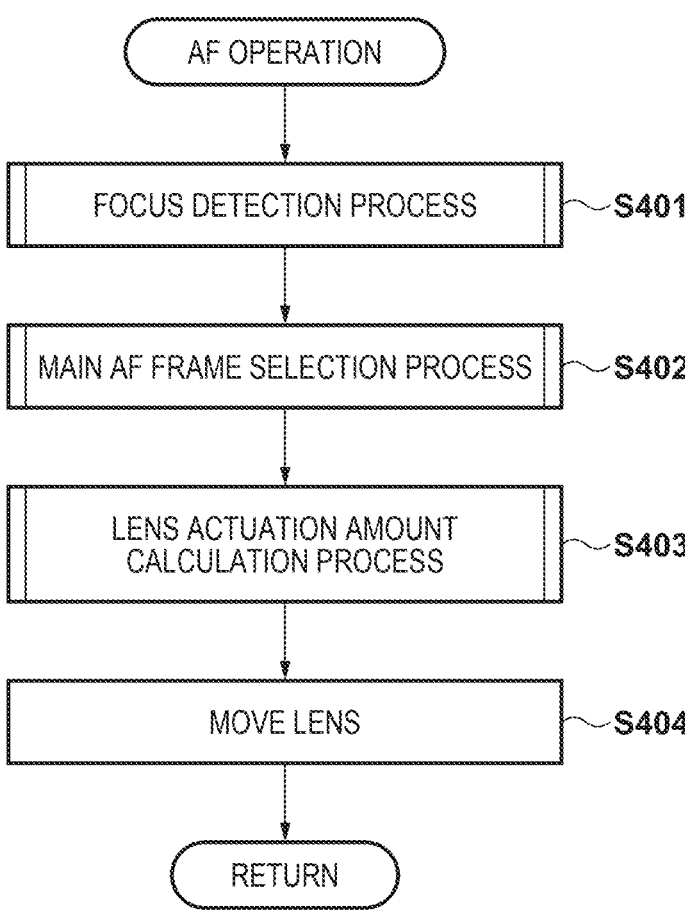
FIG. 6 is a flowchart illustrating the overall procedure of AF operation according to the embodiment.

FIG. 6 is a flowchart explaining the overall flow of the AF operation performed in step S203.

First, in step S401, a focus detection process is performed to detect the defocus amount and the process proceeds to step S402. The focus detection process will be described later.

In step S402, the subject detection information obtained in step S301 is used to perform a main AF frame selection process (described later), and the process proceeds to step S403. In step S403, the main AF frame selection result obtained in step S402 is used to calculate the actuation amount of the focus lens (described later), and the process proceeds to step S404. In step S404, the focus lens actuation amount obtained in step S403 is transmitted to the lens communication unit 210, the focus lens 103 is moved, and the AF operation ends.

Focus Detection Process

Next, the focus detection process performed in step S401 will be described with reference to FIG. 7.

First, in step S501, from the image data output from the image sensor 201, an area of one unprocessed AF frame from the AF frames set in step S202 is set as a focus detection area, and the process proceeds to step S502. In step S502, a pair of image signals (A image signal, B image signal) that are focus detection signals are acquired from pixels in the area of the image sensor 201 that corresponds to the focus detection area set in step S501, and the process proceeds to step S503. In step S503, an averaging process in the vertical direction is performed to average the pairs of image signals acquired in step S502 in the vertical direction, and the process proceeds to step S504. This process makes it possible to reduce the effects of noise in the image signals.

In step S504, a filtering process is performed to extract signal components of a predetermined frequency band from the signals obtained as a result of the averaging process in the vertical direction in step S503, and the process proceeds to step S505. In step S505, correlation amounts are calcu-lated from the signals obtained by the filtering process in step S504, and the process proceeds to step S506. In step S506, correlation change amounts are calculated from the correlation amounts calculated in step S505, and the process proceeds to step S507. In step S507, an image shift amount is calculated from the correlation change amount calculated in step S506, and the process proceeds to step S508. In step S508, reliability indicating how reliable the image shift amount calculated in step S507 is calculated, and the process proceeds to step S509. In step S509, the image shift amount is converted into a defocus amount.

In step S510, it is determined whether or not there is an unprocessed AF frame among the AF frames set in step S202. If there is an unprocessed AF frame, the process returns to step S501 and the above processes are repeated for the next unprocessed AF frame. If all the set AF frames are processed, the focus detection process is ended.

Main Frame Selection Process

FIG. 8 is a flowchart explaining the main AF frame selection process performed in step S402.

First, in step S601, it is determined whether a subject has been detected by the subject detection unit 211. If not, the process proceeds to step S602, where the main AF frame is selected using a first selection method that does not use subject detection information, and the main AF frame selec-tion process ends. As the first selection method, for example, a method of selecting a predetermined area in the screen (for example, an area including the center position) from the AF frame set in step S308 as the main AF frame is considered, but it is not limited to this, and known techniques may be used.

On the other hand, if a subject is detected, the process proceeds to step S603, where a main AF frame is selected from the AF frames for which the focus detection process has been performed using a second selection method, and the process proceeds to step S604.

Here, details of the main AF frame selection process using the second selection method performed in step S603 will be described with reference to the flowcharts of FIGS. 9 and 12.

First, in step S701 in FIG. 9, it is determined whether the subject's pupil is detected by the subject detection unit 211. If an pupil is detected, the process proceeds to step S702, and if no pupil is detected, the process proceeds to step S703. In step S702, the pupil area is added as a main AF frame selection area, and the process proceeds to step S703.

In step S703, it is determined whether or not the face of the subject is detected by the subject detection unit 211. If a face is detected, the process proceeds to step S704, and if a face is not detected, the process proceeds to step S705. In step S704, the face area is added as the main AF frame selection area, and the process proceeds to step S705.

In step S705, it is determined whether or not the torso (body) of the subject is detected by the subject detection unit 211. If the torso is detected, the process proceeds to step S706, and if the torso is not detected, the process proceeds to step S707. In step S706, the torso area is added as the main AF frame selection area, and the process proceeds to step S707.

In step S707, it is determined whether the number of AF frames including the main AF frame selection area is equal to or greater than a first threshold value. Here, the AF frame including the main AF frame selection area is an AF frame whose center is included in the main AF frame selection area, but is not limited thereto. For example, an AF frame may include at least a part of the main AF frame selection area, or an AF frame whose area overlaps the main AF frame selection area by a predetermined ratio or more. If the number of AF frames that include the main AF frame selection area is equal to or greater than a first threshold value, the process proceeds to step S708, otherwise the process proceeds to step S711.

In step S708, the defocus amount calculated for each AF frame including the main AF frame selection area is classified by predetermined depth to create a histogram. Then, in step S709, it is determined whether the peak value of the histogram created in step S708 is equal to or greater than a predetermined second threshold. In this embodiment, the maximum number of AF frames in the histogram is normalized by the total number of AF frames and converted into a percentage, which is used as the peak value. If the peak value is equal to or greater than the second threshold, the process proceeds to step S710, and if it is less than the second threshold, the process proceeds to step S711.

In step S710, the state is such that a first threshold value or more of AF frames exist in the main AF frame selection area, and in one depth (peak value bin) the second threshold value or more of percentage of the defocus amounts of the AF frames exist (hereinafter this state is referred to as the "first state"). In this case, a main AF frame selection process depending on the first state is performed.

On the other hand, in step S711, the number of AF frames included in the main AF frame selection area is less than the first threshold value, or even if it is equal to or greater than the first threshold value, the defocus amounts of the AF frames are scattered at multiple depths (hereinafter this state is referred to as the "second state"). In this case, a main AF frame selection process depending on the second state is performed.

In this embodiment, the main AF frame is selected in different ways in the different states described above.

Figure 10:
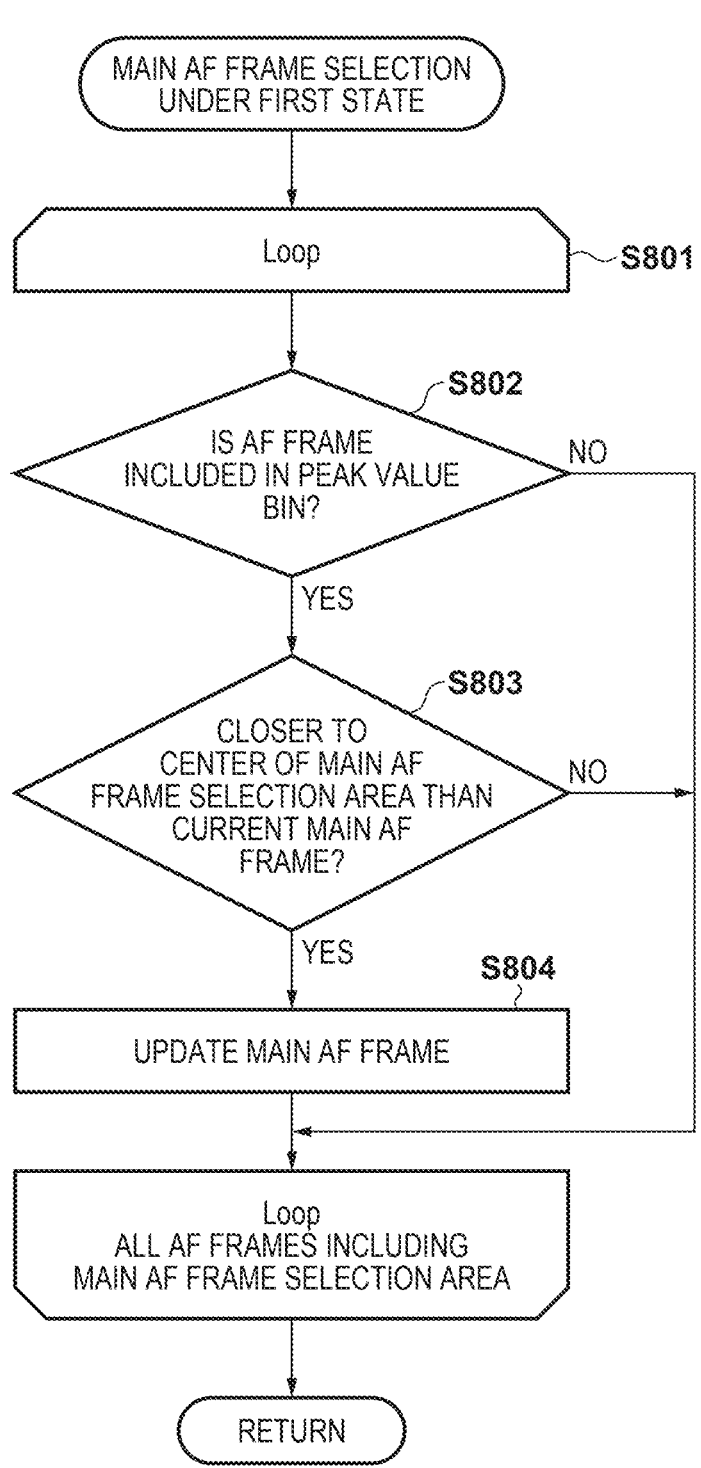
FIG. 10 is a flowchart explaining main AF frame selection under a first state according to the embodiment.

FIG. 10 is a flowchart illustrating the main AF frame selection process under the first state performed in step S710.

First, in step S801, a loop process is started for all AF frames including the main AF frame selection area in order to select a main AF frame in the main AF frame selection area. In step S802, it is determined whether the AF frame being processed is an AF frame included in the peak value bin of the histogram. If so, the process proceeds to step S803, and if not, the loop process is repeated for another AF frame. In step S803, it is determined whether the AF frame being processed is closer to the center of the main AF frame selection area than the currently selected main AF frame, and if so, the process proceeds to step S804 to update the main AF frame, and if not, the loop process is repeated for another AF frame. The center of the main AF frame selection area may be, for example, the center of the maximum widths of the main AF frame selection area in the horizontal and vertical directions, or the center of gravity of the main AF frame selection area.

When the loop of step S801 ends, the main AF frame selection process under the first state ends. Through the above process, the AF frame that is closest to the center of the main AF frame selection area is selected as the main AF frame from among the AF frames included in the peak value bin.

Figure 11:
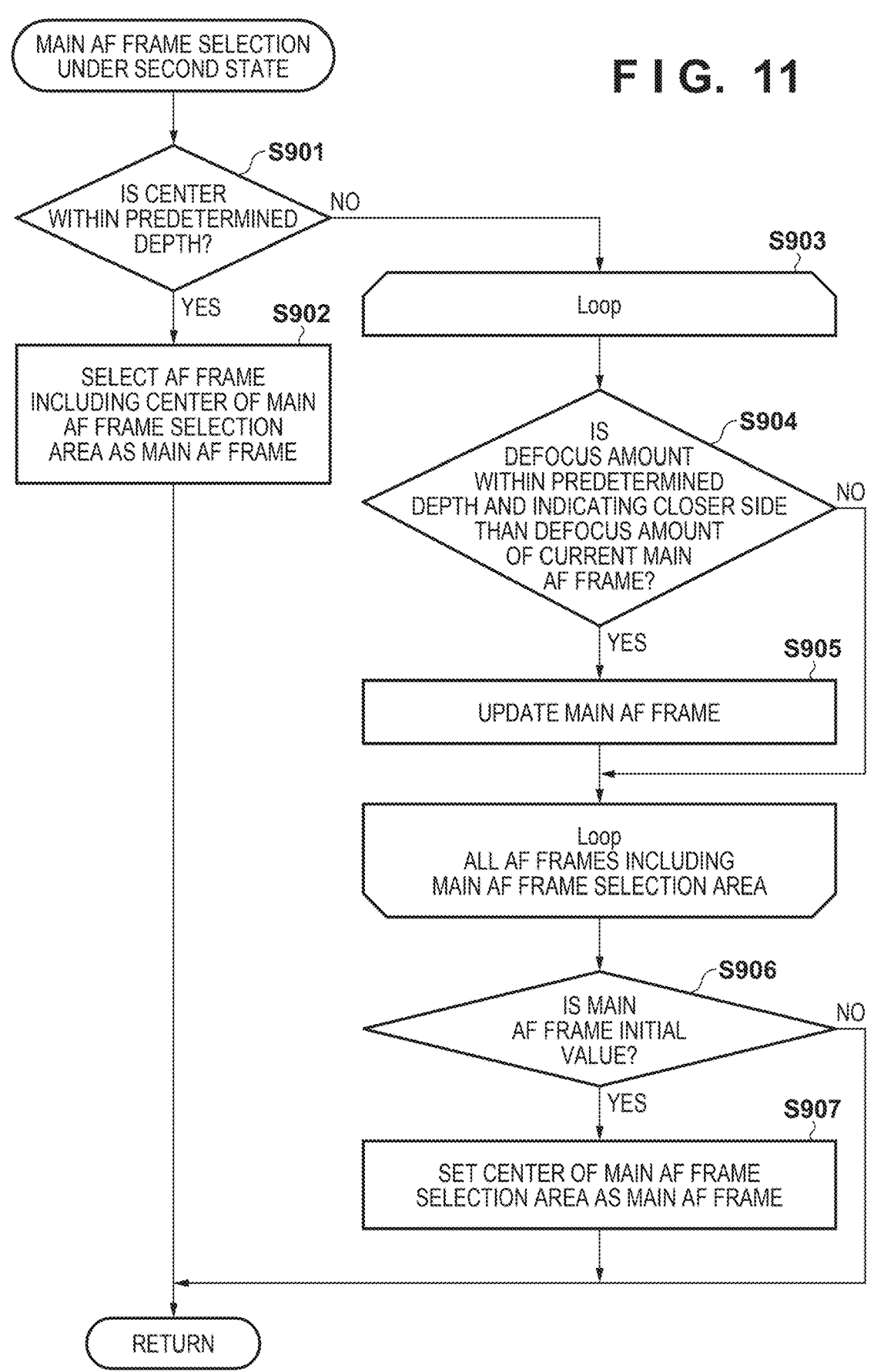
FIG. 11 is a flowchart explaining main AF frame selection under a second state according to the embodiment.

FIG. 11 is a flowchart illustrating the main AF frame selection process under the second state performed in step S711.

In step S901, it is determined whether the center of the main AF frame selection area is within a predetermined depth, and if it is within the predetermined depth, the process proceeds to step S902, where an AF frame including the center of the main AF frame selection area is set as the main AF frame. On the other hand, if the center of the main AF frame selection area is not within the predetermined depth, the process proceeds to step S903.

In step S903, a loop process is performed for all frames to select a main AF frame from among the AF frames including the set main AF frame selection area. The initial value of the main AF frame is assumed to be information that a state that a main AF frame is not selected (e.g., total number of frames+1) can be determined, which is not shown. In step S904, it is determined whether the defocus amount of the AF frame being processed is within a predetermined depth and indicates that the AF frame being processed is on the closer side than the defocus amount of the currently selected main AF frame, and if these conditions are met, the main AF frame is updated in step S905.

In step S906, it is determined whether or not the main AF frame can be selected by the loop of step S903, and if not, in step S907, the AF frame including the center of the main AF frame selection area is set as the main AF frame.

When the above processing is completed, the process returns to step S603 in FIG. 8.

When the main AF frame is selected by the second selection method in step S603 through the above processes, it is determined in step S604 whether or not the subject's pupil is detected by the subject detection unit 211. If the pupil is detected, the process proceeds to step S605, and if not, the main AF frame selection process ends.

In step S605, a process to select an AF frame that represents a characteristic part such as an pupil is performed.

FIG. 12 is a flow chart explaining the characteristic part representative frame selection process performed in step S605.

First, in step S1001, the pupil area is set as the characteristic part area, and the process proceeds to step S1002. Note that in this embodiment, since a person is assumed to be the subject, the pupil is considered as the characteristic part and the pupil area is set as the characteristic part area, however, the present invention is not limited to this and any part can be set as the characteristic part.

In step S1002, in order to select the characteristic part representative frame, a loop process is performed for all AF frames including the set characteristic part area. The initial value of the characteristic part representative frame is set to information (e.g., total number of frames+1) that can determine that the characteristic part representative frame has not been selected, which is not shown. In step S1003, it is determined whether the defocus amount of the AF frame being processed is within a predetermined depth and indicating that the AF frame being processed is on the closer side than the currently selected characteristic part representative frame, and if the conditions are satisfied, the characteristic part representative frame is updated in step S1004. In step S1005, it is determined whether the characteristic part representative frame is selected through the loop S1002, and if it is not selected, in step S1006, the AF frame including the center of the characteristic part area is set as the characteristic part representative frame.

Then, the main AF frame selection process ends, and the process returns to step S402 in FIG. 6.

Lens Actuation Amount Calculation Process

FIG. 13 is a flowchart explaining the lens actuation amount calculation process in step S403.

First, in step S1301, the focus detection result of the main AF frame selected in step S402 is recorded, and the process proceeds to step S1302. Since the focus detection result of the main AF frame is recorded every time focus detection is performed, it is possible to trace back the history of past focus detection results.

In step S1302, it is determined whether the characteristic part representative frame is selected. If it is selected, the process proceeds to step S1303. If it is not selected, the process proceeds to step S1304.

In step S1303, the relative position of the image plane position of the characteristic part obtained from the main AF frame selected in step S603 and the focus detection result of the characteristic part representative frame selected in step S605 is recorded. The relative position of the characteristic part is obtained by subtracting the image plane position of the main AF frame from the image plane position of the characteristic part representative frame, and indicates the relative position of the image plane position of the characteristic part representative frame with respect to the image plane position of the main AF frame. Since the relative position of the characteristic part is recorded every time focus detection is performed and a characteristic part representative frame is selected, it is possible to trace back the history of past relative positions. When recording of the relative position of the characteristic part is completed, the process proceeds to step S1304.

In step S1304, the subject movement prediction unit 219 performs prediction process to predict the image plane position using the history of focus detection results, and the process proceeds to step S1305. Details of the prediction process will be described later.

In step S1305, the actuation target of the focus lens is set to the predicted image plane position, and the lens actuation amount calculation process ends.

Figure 14:
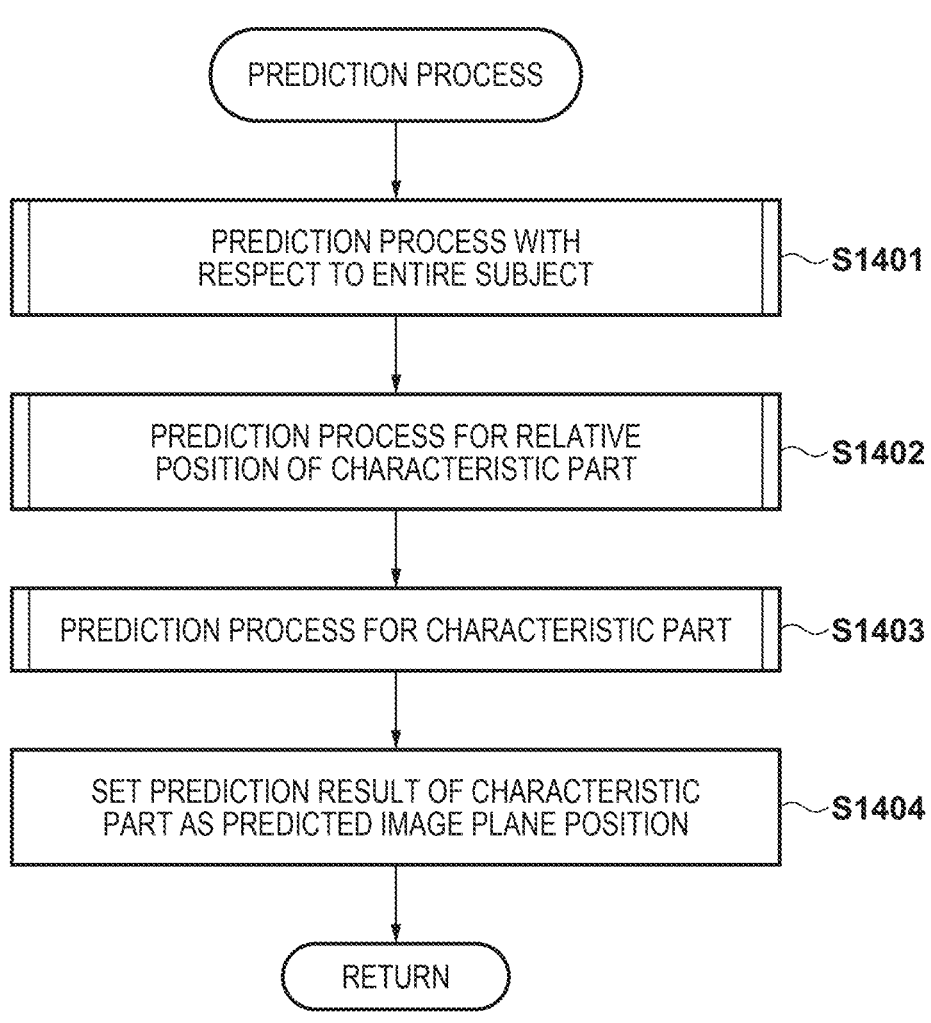
FIG. 14 is a flowchart of a prediction process according to the embodiment.

FIG. 14 is a flowchart explaining the prediction process performed in step S1304.

First, in step S1401, prediction process for the entire subject is performed using the focus detection results of the main AF frame recorded in step S1301.

In the prediction process for the entire subject, a prediction curve is drawn based on the focus detection history to obtain the predicted position of the entire subject. A curve 1501 in FIG. 15 shows an example of a prediction curve, with the vertical axis indicating the image plane position and the horizontal axis indicating the time. The larger the image plane position in the vertical axis direction, the farther the distance is, and thus the history shown in FIG. 15 shows a situation of tracking a subject approaching the photographer (camera). As described above, the AF operation in step S203 is performed periodically in the servo shooting mode, and T1 to T5 each indicate the time when the AF operation in step S203 is performed.

A predicted image plane position is obtained by, for example, deriving a prediction curve by the bulk least squares method using the past image plane positions and the respective focus detection times, and calculating the image plane position at the prediction time based on this curve. The predicted time indicates the time of shooting if SW2 is ON, and indicates the current focus detection time if SW2 is not ON. In addition, the prediction method is not limited to the bulk least squares method, and in a case of using, for example, the recursive least squares method, it is not necessary to store the history of a plurality of past focus detection results, and the parameters calculated during the previous AF operation may be recorded to replace the focus detection history. When the prediction process for the entire subject is completed, the process proceeds to step S1402.

In step S1402, the relative position of the characteristic part is predicted using the history of the relative positions of the characteristic parts recorded in step S1303.

In predicting the relative position of the characteristic part, a prediction change amount is obtained by drawing a prediction curve using the history of past relative positions. A curve 1601 in FIG. 16 shows an example of a prediction curve, with the vertical axis indicating the relative position and the horizontal axis indicating the time, and the larger the relative position in the vertical axis direction, the further away the characteristic part is from the entire subject, and thus the history shown in FIG. 16 shows a state in which a subject having a characteristic part that protrudes toward the photographer (camera), such as a flying bird, is tracked as it approaches the photographer. As described above, the AF operation in step S203 is performed periodically in the servo shooting mode, and T1 to T5 each represent the time of performing the AF operation in step S203.

The predicted relative position can be obtained by, for example, deriving a prediction curve by the bulk least squares method using past image plane positions and respective focus detection times, and calculating the image plane position at the prediction time based on this curve. If SW2 is ON, the prediction time indicates the time of shooting, and if not, the current focus detection time. Furthermore, the prediction method is not limited to the bulk least squares method, and in a case of using the recursive least squares method, for example, it is not necessary to store a history of a plurality of past focus detection results, and the parameters calculated during the last AF operation can be recorded to replace the focus detection history.

In addition, the width of depth of the subject may be estimated in advance at the time of focus detection, and the relative position of the characteristic part may be expressed using the width of depth of the subject. For example, the ratio between the width of depth of the subject and the relative position of the characteristic part may be predicted by the bulk least squares method or the recursive least squares method, thereby predicting the relative position of the characteristic part. Alternatively, the relative position of the characteristic part may be expressed by approximating a simple harmonic motion model with the width of depth of the subject as its amplitude. As an estimation of the width of depth of the subject, for example, a histogram created when selecting the main AF frame with respect to the all subjects may be used to obtain a width of depth of the subject that is a sum of the depth widths of all bins including the AF frames including the main AF frame selection area. In addition, leaning is performed so as to be able to estimate the width of depth of the subject in advance using the type of the detected subject, shooting distance, and image information, and the width of depth of the subject estimated by using the leaning result may be used. Note that if there is no record of the characteristic part being detected in the past, the relative position of the characteristic part is set to 0. When the prediction process of the relative position of the characteristic part is completed, the process proceeds to step S1403.

In step S1403, prediction processing of the characteristic part is performed using the prediction result of the entire subject obtained in step S1401 and the prediction result of the relative position of the characteristic part obtained in step S1402.

If the prediction formula for the entire subject is a function of time t, L(t), and the prediction formula for the relative position of the characteristic part is l(t), then the prediction formula for the characteristic part, L'(t), can be expressed by the following formula (1).

$$L'(t) = L(t) + l(t) \tag{1}$$

FIG. 17 shows a prediction curve 1702 of the characteristic part when the prediction curve of the all subjects is as shown in FIG. 15 and the prediction curve 1701 of the relative position of the characteristic part is as shown in FIG. 16. When the prediction process of the characteristic part is completed, the process proceeds to step S1404.

In step S1404, the prediction result of the characteristic part obtained in step S1403 is set as a predicted image plane position, and the prediction process ends.

Note that the prediction of the relative position of the characteristic part shown in step S1403 can be calculated if there is a history in which the characteristic part has been detected at least once in the past, even if the characteristic part is not currently detected. If the model of the prediction curve is made more stable in advance by using time-series data for a long time, or making the curvature low, even if information on the characteristic part is partially missing, the relative position of the characteristic part can be estimated using the history, and the position where the characteristic part is assumed to be located can be continuously tracked.

Furthermore, if there is no record of the characteristic part having been detected in the past, the prediction formula L'(t) of the characteristic part is expressed as the following formula (2)

$$L'(t) = L(t) \tag{2}$$

by setting the relative position of the characteristic part to 0, and the focus detection result of the main AF frame becomes the prediction result of the characteristic part.

As described above, according to this embodiment, by using the focus detection history of a plurality of focus detection areas contained within the same subject, it is possible to continue to focus on a high priority detection area even if there is a temporary change in the state of the subject.

In the above explanation, the processing is performed using the defocus amount, but other than the defocus amount, as long as the information indicates the focus state, the above-mentioned process can be performed using that information.

In the above description, the prediction process is performed based on the image plane position, but the present invention is not limited to this, and prediction can be performed using information that indicates the focus state, such as the defocus amount and the focus distance. Note that the image plane position is also included in the in-focus state in a broad sense.

Other Embodiments

The present invention may be applied to a system consisting of a plurality of devices, or to a device consisting of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-223261, filed Dec. 28, 2023 which is hereby incorporated by reference herein in its entirety.

What is claimed is:

1. A focus detection apparatus comprising one or more processors and/or circuitry which function as:

a subject detection unit that detects a subject and a characteristic area included in the subject from an image of an image signal repeatedly output from an image capturing apparatus;

a setting unit that sets a plurality of focus detection areas of a predetermined size in the subject and the characteristic area detected by the subject detection unit;

a detection unit that detects a focus state in each of the plurality of focus detection areas set by the setting unit based on the image signal;

a selection unit that selects a first area that satisfies a predetermined condition and a second area that includes the characteristic area from the plurality of focus detection areas;

a prediction unit that predicts a focus state of the second area at an arbitrary time based on a first history of focus state of the first area based on the focus states detected by the detection unit and a second history of difference between the focus state of the first area and the focus state of the second area; and an acquisition unit that acquires an actuation amount of a focus adjustment unit for focusing on the second area based on the focus state of the second area predicted by the prediction unit.

2. The focus detection apparatus according to claim 1, wherein the prediction unit predicts a focus state of the first area at the arbitrary time based on the first history, and predicts the difference at the arbitrary time based on the second history.

3. The focus detection apparatus according to claim 2, wherein the prediction unit predicts the focus state of the first area and the difference at the arbitrary time by a bulk least squares method or a recursive least squares method based on the first history and the second history.

4. The focus detection apparatus according to claim 2, wherein the one or more processors and/or circuitry further functions as:

an estimation unit that estimates a width of depth of the subject, wherein the prediction unit predicts the difference at the arbitrary time by predicting the ratio of the width of depth and the difference by a bulk least squares method or a recursive least squares method.

5. The focus detection apparatus according to claim 2, wherein the one or more processors and/or circuitry further functions as:

an estimation unit that estimates a width of depth of the subject, wherein the prediction unit predicts the difference at the arbitrary time by approximating using a simple harmonic motion model with the width of depth of the subject as an amplitude.

6. The focus detection apparatus according to claim 2, wherein the prediction unit predicts the focus state of the second area at the arbitrary time by adding the difference to a predicted focus state of the first area at the arbitrary time.

7. The focus detection apparatus according to claim 4, wherein the estimation unit classifies the plurality of focus detection areas into a plurality of depths of a predetermined width based on the focus states of the plurality of focus detection areas, and estimates a width of depth including the plurality of focus detection areas as a width of depth of the subject.

8. The focus detection apparatus according to claim 4, wherein the estimation unit performs learning to estimate the width of depth of the subject based on a type of the subject, shooting distance, and image information, and estimates the width of depth of the subject.

9. The focus detection apparatus according to claim 5, wherein the estimation unit classifies the plurality of focus detection areas into a plurality of depths of a predetermined width based on the focus states of the plurality of focus detection areas, and estimates a width of depth including the plurality of focus detection areas as a width of depth of the subject.

10. The focus detection apparatus according to claim 5, wherein the estimation unit performs learning to estimate the width of depth of the subject based on a type of the subject, shooting distance, and image information, and estimates the width of depth of the subject.

11. The focus detection apparatus according to claim 1, wherein, in a case where the second history does not exist, the prediction unit predicts the relative position of the characteristic area at the arbitrary time as 0.

12. The focus detection apparatus according to claim 1, wherein, in a case where a number of the plurality of focus detection areas is equal to or greater than a predetermined first threshold, the selection unit classifies the plurality of focus detection areas into a plurality of depths of a predetermined width based on the focus states of the plurality of focus detection areas, and selects the first area based on a result of the classification.

13. The focus detection apparatus according to claim 12, wherein, in a case where a percentage of the focus detection areas in a depth to which the focus detection areas are classified most frequently among the plurality of depths is equal to or greater than a predetermined second threshold, the selection unit selects, as the first area, a focus detection area that is closest to a center of the plurality of focus detection areas among the focus detection areas classified into the depth.

14. The focus detection apparatus according to claim 13, wherein, in a case where a number of the plurality of focus detection areas is smaller than the predetermined first threshold, or in a case where a percentage of the focus detection area in a depth to which the focus detection areas are classified most frequently among the plurality of depths is smaller than the second threshold, the selection unit selects a focus detection area closest to a center of the plurality of focus detection areas as the first area, and when the focus detection area is included in a depth width of a predetermined depth.

15. The focus detection apparatus according to claim 13, wherein, in a case where a number of the plurality of focus detection areas is smaller than the predetermined first threshold, or in a case where a percentage of the focus detection area in a depth to which the focus detection areas are classified most frequently among the plurality of depths is smaller than the second threshold, if a focus detection area closest to the center of the plurality of focus detection areas is not included in the width of the predetermined depth, the selection unit selects, as the first area, a focus detection area that indicates a closest focus state within a width of a predetermined depth.

16. The focus detection apparatus according to claim 1, wherein, in a case where the subject is a person, the characteristic area is the person's eye.

17. The focus detection apparatus according to claim 1, wherein the focus state includes an image plane position.

18. The focus detection apparatus according to claim 1, wherein the focus state includes a defocus amount.

19. An image capturing apparatus comprising:

an image sensor; and a focus detection apparatus comprising one or more processors and/or circuitry which function as:

a subject detection unit that detects a subject and a characteristic area included in the subject from an image of an image signal repeatedly output from the image capturing apparatus;

a setting unit that sets a plurality of focus detection areas of a predetermined size in the subject and the characteristic area detected by the subject detection unit;

a detection unit that detects a focus state in each of the plurality of focus detection areas set by the setting unit based on the image signal;

a selection unit that selects a first area that satisfies a predetermined condition and a second area that includes the characteristic area from the plurality of focus detection areas;

a prediction unit that predicts a focus state of the second area at an arbitrary time based on a first history of focus state of the first area based on the focus states detected by the detection unit and a second history of difference between the focus state of the first area and the focus state of the second area; and an acquisition unit that acquires an actuation amount of a focus adjustment unit for focusing on the second area based on the focus state of the second area predicted by the prediction unit.

20. The image capturing apparatus according to claim 19, further comprising:

the focus adjustment unit; and an actuation unit that actuates the focus adjustment unit at the arbitrary time by the actuation amount obtained by the acquisition unit.

21. A focus detection method comprising:

detecting a subject and a characteristic area included in the subject from an image of an image signal repeatedly output from the image capturing apparatus;

setting a plurality of focus detection areas of a predetermined size in the detected subject and characteristic area;

detecting a focus state in each of the set plurality of focus detection areas based on the image signal;

selecting a first area that satisfies a predetermined condition and a second area that includes the characteristic area from the plurality of focus detection areas;

predicting a focus state of the second area at an arbitrary time based on a first history of focus state of the first area based on the detected focus states and a second history of difference between the focus state of the first area and the focus state of the second area; and acquiring an actuation amount of a focus adjustment unit for focusing on the second area based on the predicted focus state of the second area.

22. A non-transitory computer-readable storage medium, the storage medium storing a program that is executable by the computer, wherein the program includes program code for causing the computer to function as a focus detection apparatus comprising:

a subject detection unit that detects a subject and a characteristic area included in the subject from an image of an image signal repeatedly output from the image capturing apparatus;

a setting unit that sets a plurality of focus detection areas of a predetermined size in the subject and the characteristic area detected by the subject detection unit;

a detection unit that detects a focus state in each of the plurality of focus detection areas set by the setting unit based on the image signal;

a selection unit that selects a first area that satisfies a predetermined condition and a second area that includes the characteristic area from the plurality of focus detection areas;

a prediction unit that predicts a focus state of the second area at an arbitrary time based on a first history of focus state of the first area based on the focus states detected by the detection unit and a second history of difference between the focus state of the first area and the focus state of the second area; and an acquisition unit that acquires an actuation amount of a focus adjustment unit for focusing on the second area based on the focus state of the second area predicted by the prediction unit.

* * * * *